United States Patent
Spencer (10) Patent No.: US 12,236,058 B2
(45) Date of Patent: Feb. 25, 2025

(54) PREDICTIVE SCREEN RECORDING

(71) Applicant: Microsoft Technology Licensing, LLC, Redmond, WA (US)

(72) Inventor: Herrick Heath Spencer, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/200,674

(22) Filed: May 23, 2023

(65) Prior Publication Data

US 2024/0393913 A1 Nov. 28, 2024

(51) Int. Cl.
*G06F 3/048* (2013.01)
*G06F 3/0481* (2022.01)
*G06F 3/04845* (2022.01)

(52) U.S. Cl.
CPC ........ *G06F 3/0481* (2013.01); *G06F 3/04845* (2013.01)

(58) Field of Classification Search
CPC ............................ G06F 3/0481; G06F 3/04845
See application file for complete search history.

(56) References Cited

U.S. PATENT DOCUMENTS

| | | | |
|---|---|---|---|
| 9,047,698 B2 * | 6/2015 | Maciocci | H04N 9/3173 |
| 9,934,129 B1 * | 4/2018 | Budurean | G06F 11/3692 |
| 11,126,845 B1 * | 9/2021 | Chaturvedi | G06F 3/011 |
| 11,323,653 B1 * | 5/2022 | Voss | H04N 5/77 |
| 11,843,505 B1 * | 12/2023 | Cruise | H04L 41/147 |
| 11,875,023 B2 * | 1/2024 | Fang | H04N 5/76 |
| 2018/0349480 A1 * | 12/2018 | Carlisle | G06F 16/958 |
| 2020/0125481 A1 * | 4/2020 | Walber | G06F 11/3676 |
| 2021/0081102 A1 * | 3/2021 | Graham | G06F 3/04883 |
| 2021/0133850 A1 * | 5/2021 | Ayush | G06V 10/945 |
| 2021/0405832 A1 * | 12/2021 | Brown | G06F 3/04817 |
| 2022/0224858 A1 * | 7/2022 | Voss | G06F 1/1686 |
| 2023/0260000 A1 * | 8/2023 | Belavy | G06N 5/01 705/26.63 |

(Continued)

FOREIGN PATENT DOCUMENTS

| | | |
|---|---|---|
| CN | 105808233 A | 7/2016 |
| CN | 106406710 A | 2/2017 |
| CN | 108769784 A | 11/2018 |

(Continued)

OTHER PUBLICATIONS

"Adobe Captivate—Screen Capture Recorder", Retrieved From: https://www.adobe.com/in/products/captivate/screen-recording.html?gclid=CjwKCAiA68ebBhB-EiwALVC-NkybpVI2r8ezo8c714kDvxsJm5OelC9h6q4aG2MIb15oKE0EtNp71hoC4bEQAvD_BwE&sdid=TG8SLLXG&mv=search&promoid=70114000002XDiUAAW&ef_id=CjwKCAiA68ebBhB-EiwALVC-NkybpVI2r8ezo8c714kDvxsJm5OelC9h6q4aG2MIb15oKE0EtNp71hoC4bEQAvD_BwE:G:s&s_kwcid=AL!3085!3!.

(Continued)

*Primary Examiner* — David Phantana-angkool (57) ABSTRACT

Aspects of the present disclosure relate to predictive screen recording. In examples, a user initiates screen recording, such that an initial recording region is recorded. During screen recording, one or more events, user inputs, and/or any of a variety of other features are processed to generate a predicted recording region, which is used to update the region for which screen recording output is generated accordingly. Thus, the recorded region of the screen may change dynamically, thereby reducing the amount of post-processing, planning, and computing resources that would otherwise be associated with recording the screen of a computing device, among other examples.

20 Claims, 8 Drawing Sheets

(56) References Cited

U.S. PATENT DOCUMENTS

2023/0418426 A1* 12/2023 Karunamuni ......... G06F 1/1686
2024/0040068 A1*  2/2024 Pena ..................... H04N 5/783

FOREIGN PATENT DOCUMENTS

| CN | 111338536 A    | 6/2020  |
|----|----------------|---------|
| CN | 111666024 A    | 9/2020  |
| CN | 111866423 A    | 10/2020 |
| KR | 20140081087 A  | 7/2014  |
| KR | 20220078419 A  | 6/2022  |
| WO | 2022017096 A1  | 1/2022  |

OTHER PUBLICATIONS

International Search Report and Written Opinion received for PCT Application No. PCT/US2024/026924, mailed on Sep. 12, 2024, 11 pages.

\* cited by examiner

PREDICTIVE SCREEN RECORDING

BACKGROUND

A user may specify a region of a screen to be recorded prior to starting screen recording. In such examples, the user is unable to change the region after recording has started, which may result in user frustration and/or wasted computing resources, especially in instances where the user later decides to record more or less of the screen. Additionally, to record multiple applications and/or to show a region of the screen in greater detail, the user may need to create multiple screen recordings (e.g., showing multiple applications together, each application separately, and/or the region in detail), which introduces additional complexity and may diminish recording quality, among other detriments.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to predictive screen recording. In examples, a user initiates screen recording, such that an initial recording region is recorded. During screen recording, one or more events, user inputs, and/or any of a variety of other features are processed to generate a predicted recording region, which is used to update the region for which screen recording output is generated accordingly. Thus, the recorded region of the screen may change dynamically, thereby reducing the amount of postprocessing, planning, and computing resources that would otherwise be associated with recording the screen of a computing device, among other examples.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a user specifies a region of a screen for which a screen recording is to be generated. For example, the user may select an application, select a window, and/or specify a shape (e.g., defined by two or more coordinates). The user may thus initiate screen recording, such that the specified region of the screen is recorded. However, once screen recording is initiated, the user may be unable to change the region. For example, the user may wish to expand the region to capture an additional application and/or window, or the user may wish to shrink the region to capture one or more aspects of the user interface in greater detail, among other examples. Accordingly, the user may create multiple screen recordings (e.g., of each application/window and/or of an overview and a detail view), which may then be combined through postprocessing (e.g., using a video editor or other application). However, the need for postprocessing introduces additional complexity, utilizes additional computing resources (e.g., as a result of cropping, combining, and/or reencoding the screen recording outputs), and/or results in diminished quality (e.g., as a result of reencoding), among other detriments.

Accordingly, aspects of the present disclosure relate to predictive screen recording. In examples, a user initiates screen recording, thereby causing a region of the screen to be recorded. For example, the user specifies an initial recording region and/or the initial recording region may be predicted according to aspects described herein. During screen recording, one or more events, user inputs, and/or any of a variety of other features are processed to generate a predicted recording region, which is used to update the region for which screen recording output is generated accordingly. Example events include, but are not limited to, a change to the active window, a change to the active application, and/or a graphical notification, among other examples. Example user inputs include, but are not limited to, mouse, touch, or stylus input (referred to herein as pointer input) above a window of an application (which need not be the active window/application), the degree to which the user switches between a first and second application, and/or an amount of time a user lingers over a user interface element, among other examples.

Thus, the region of the screen for which screen recording output is generated may change dynamically according to aspects of the present disclosure (e.g., based on a predicted recording region and/or in response to user input), thereby reducing the amount of postprocessing, planning, and computing resources that would otherwise be associated with recording the screen of a computing device.

For instance, if it is determined that the user has lingered over a user interface element for an amount of time that exceeds a predetermined threshold, a predictive recording region may be generated that more closely focuses on the user interface element (e.g., thereby decreasing the relative dimensions of the predictive recording region). As another example, if it is determined that the user has switched between two windows/applications (e.g., having an associated first window and a second window, as a result of an event indicating a change to the active window) a predetermined amount of times and/or within a predetermined time period, a predictive recording region may be generated that incorporates at least a part of the first window and the second window (e.g., thereby increasing the dimensions of the predictive recording region). As a further example, if it is determined that the user has transitioned from providing input to a first window to providing input to a second window (e.g., for a predetermined amount of time, based on user input associated with the second window), a predictive recording region is generated that shifts and/or is resized to focus more specifically on the second window.

While examples are described with respect to windows and/or applications, it will be appreciated that similar techniques may be used for any of a variety of alternative or additional user interface elements. Other example user interface elements include, but are not limited to, menu items, drop down menus, notifications, and/or system windows (e.g., a start menu, a search input field, or other elements having the highest z-layer). Additionally, it will be appreciated that any of a variety of alternative or additional features may be used in other examples. For instance, a user may specify a set of features to be used for predicted recording region generation according to aspects described herein. As an example, a user may select whether user input, events, or a combination thereof is used. As another example, the user may indicate an application, window, and/or other region that is to be included or excluded from a screen recording, such that the predicted recording region is generated accordingly.

Screen recording output generated according to aspects described herein includes a plurality of frames associated with a predicted recording region of a screen of a computing device. Thus, the screen recording output may be a video that, in some examples, includes audio (e.g., system audio and/or audio input). In examples, the screen recording output has an associated set of attributes, including, but not limited to, a pixel height and a pixel width (collectively referred to herein as pixel dimensions). For example, the pixel dimensions may correspond to the dimensions of an initial recording region and/or of a predicted recording region, among other examples. As another example, the pixel dimensions of the screen recording output are selected to include at least a part of the predicted recording region(s) without cropping and/or scaling.

One or more frames of the screen data (e.g., corresponding to a region for which the screen recording is generated) may be cropped and/or scaled to fit the pixel dimensions of the screen recording output accordingly. In examples where the dimensions of the cropped and/or scaled screen data does not match the pixel dimensions of the screen recording output, padding may be added (e.g., having a solid color or including a blurred representation of the screen data). For example, if the pixel dimensions of screen recording output initially correspond to a region of a first application and a predicted recording region is later generated that further includes a second application, screen data corresponding to the predicted recording region is scaled down to fit within the pixel dimensions. As another example, if the pixel dimensions of screen recording output initially correspond to a region of a first application and a predicted recording region is generated that focuses more closely on a user interface element of the first application, screen data corresponding to the predicted recording region is scaled up to fill the pixel dimensions accordingly. Additional examples of such aspects are discussed below with respect to FIGS. 3A-3C.

It will be appreciated that any of a variety of techniques may be used to generate a predicted recording region according to aspects described herein. For example, a set of rules may be used to process one or more features (e.g., in relation to one or more predefined thresholds and/or other criteria), as was described in the examples above. Alternatively, or additionally, a machine learning (ML) model is used to generate a predicted recording region accordingly. For example, a set of features (e.g., relating to user inputs and/or events) is provided to the ML model for processing, such that the ML model generates the predicted recording region based on the features accordingly. For example, the ML model may have been trained using training data that associates one or more events and a corresponding region (e.g., of a window, application, or other user interface element). Additionally, or alternatively, the ML model is trained based on explicit and/or implicit feedback relating to one or more predicted recording regions that were generated by the ML model, thereby enabling the ML model to improve predicted recording region generation based on such feedback.

In examples, a graphical representation of the recording region is displayed. For example, a rectangle (or other shape) is superimposed over one or more user interface element that are displayed on the screen of the device. Additionally, or alternatively, one or more regions that are outside of the recording region are dimmed, desaturated, or otherwise adapted to indicate that such regions are outside of the recording region. It will therefore be appreciated that any of a variety of techniques may be used to provide a graphical indication to the user as to a recording region for which screen recording output is being generated according to aspects described herein.

In some examples, one or more "handles" are displayed (e.g., in association with a graphical representation of the recording region). For example, each handle may have an associated point, such that the set of associated points defines the shape of the recording region. Such handles may be displayed even during screen recording, thereby enabling the user to resize or otherwise change a predicted recording region accordingly. In some instances, the user provides keyboard input and/or any of a variety of other input to indicate that mouse, touch, or stylus input is intended to interact with a handle rather than a user interface element thereunder. In examples, a user change to the predicted recording region is used to generate telemetry data (e.g., including the changed recording region and the predicted recording region), which may be incorporated as feedback into an ML model as noted above, thereby improving the predictive nature of the ML model. Additionally, or alternatively, user feedback may be solicited for generated screen recording output, which may similarly be associated with one or more predicted recording regions (e.g., to indicate whether a predicted screen recording region was correct or incorrect, or whether user input was received to adjust the predicted screen recording region) and used as feedback to train an ML model accordingly.

As an example of the disclosed aspects, a user may initiate a screen recording session to record two applications (or, as another example, two windows of the same application). In such an example, the user may first provide user input to the first application, and then transition to providing input to the second application. According to the disclosed aspects, the predicted recording region (or, as another example, an initial user-provided recording region) may include the first application, and may then transition to further include the second application. In some instances, the predicted region instead transitions to only include the second application (or, as another example, transitions to include both applications and then transitions to only include the second application after a period of time has elapsed). The region with which the screen recording output is generated may thus transition between these and/or other regions for the duration of the user's screen recording session. Thus, a screen recording that is generated according to aspects described herein dynamically adapts to applications, windows, and/or other regions at which a user is focused, thereby providing both a better experience for screen recording and for viewers, among other benefits.

While examples are provided in the context of generating screen recording output, it will be appreciated that a predicted region may be generated for any of a variety of other contexts. For example, a predicted region may be generated for screen sharing (e.g., as part of a video conference and/or remote desktop session). As another example, a predicted region is generated and presented to the user as a candidate for an initial recording region, such that the user may select the predicted region and initiate screen recording, screenshot capture, and/or screen sharing accordingly, among other examples.

Figure 1:
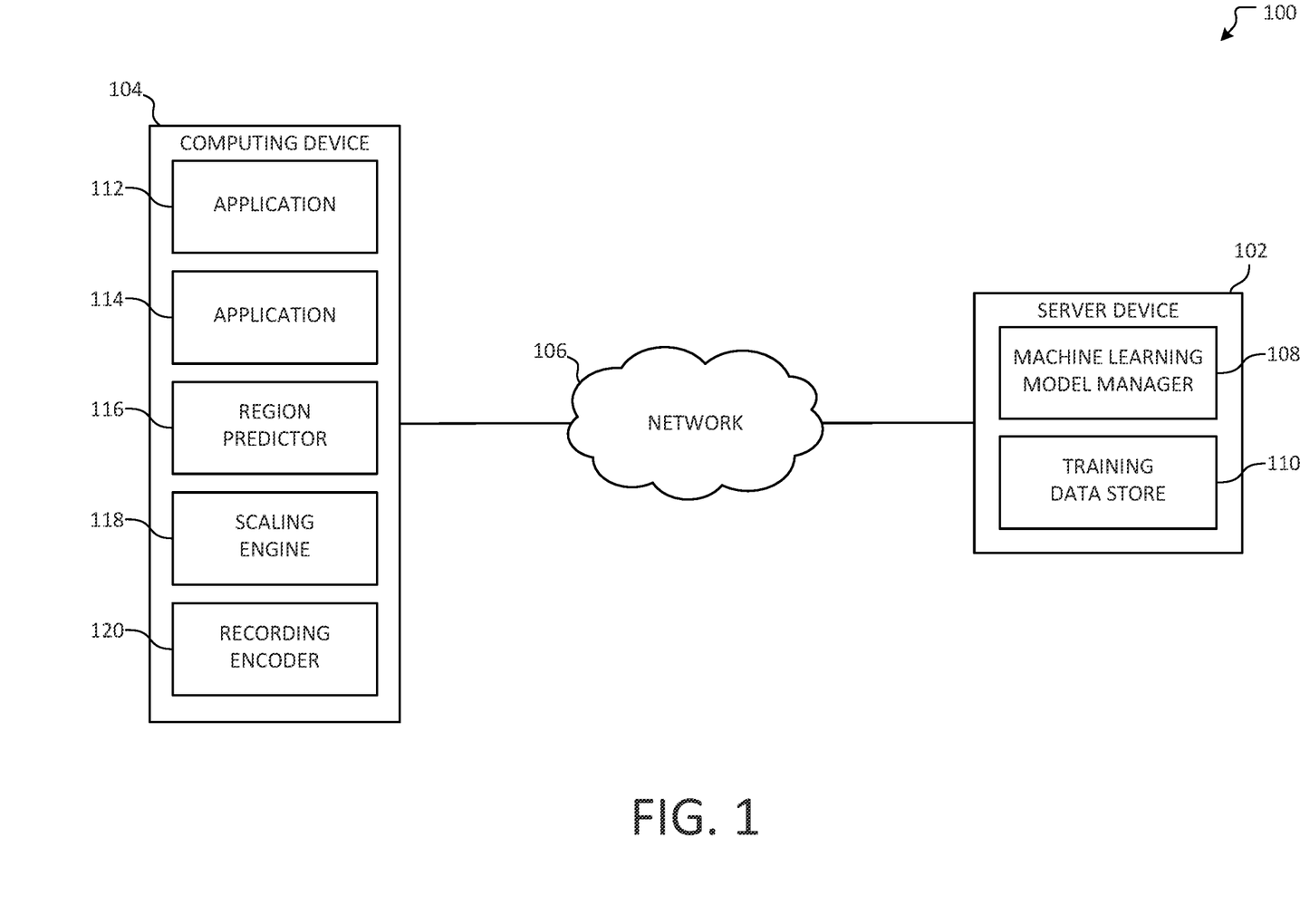
FIG. 1 illustrates an overview of an example system for predictive screen recording according to aspects described herein.

FIG. 1 illustrates an overview of an example system 100 for predictive screen recording according to aspects described herein. As illustrated, system 100 includes server device 102, computing device 104, and network 106. In examples, server device 102 and computing device 104 communicate via network 106, which may comprise a local area network, a wireless network, or the Internet, or any combination thereof, among other examples.

Computing device 104 may include any of a variety of computing devices, including, but not limited to, a tablet computing device, a mobile computing device, a laptop computing device, or a desktop computing device, among other examples. As illustrated, computing device 104 includes application 112, application 114, region predictor 116, scaling engine 118, and recording encoder 120.

In examples, a user of computing device 104 provides user input to initiate a screen recording session (e.g., of application 112 and/or application 114) according to aspects described herein. As noted above, the user input may include an indication as to an initial recording region for which the screen recording output is to be generated. In another example, a predicted region for the screen recording is generated according to aspects described herein and used as the initial recording region accordingly. In other examples, the screen recording session is initiated automatically (e.g., after a predetermined amount of time has elapsed or in response to the occurrence of an event).

As such, region predictor 116 processes one or more events and/or user inputs during the screen recording session to update the recorded region using a predicted recording region according to aspects of the present disclosure. For instance, region predictor 116 evaluates a set of rules to generate the predicted recording region. As an example, region predictor 116 evaluates which application (e.g., of application 112 and application 114) is the topmost window and/or which application is subject to user input, among any of a variety of additional or alternative events, such that the generated predicted recording region includes the determined application accordingly. As noted above, such an evaluation may be based on one or more thresholds, for example such that pointer input is associated with an application for a predetermined amount of time prior to generating a predicted recording region that includes the application.

As another example, region predictor 116 processes the events and/or user input using a machine learning model, such that the machine learning model generates a predicted recording region based on such features. In examples, the machine learning model is local to computing device 104, as may have been received from machine learning model manager 108. As noted above, implicit and/or explicit user feedback may be obtained via computing device 104, which may be aggregated by server device 102 and stored in training data store 110 accordingly.

As a result, a machine learning model provided by server device 102 may thus be trained using training data from training data store 110. Example training data includes, but is not limited to, a predicted recording region (e.g., as may have been generated by a region predictor) and associated implicit and/or explicit feedback. For instance, a predicted recording region is included as a negative training example in an instance where user input is received to change the predicted recording region (e.g., via a handle associated with the recording region). As another example, training data store 110 stores an initial recording region and/or a revised recording region (e.g., as may result from user input) in association with a set of features for which the recording region was used to record the screen. For example, the recording region is stored in association with an indication as to a set of applications that were open on a computing device, which application was active, and/or a set of coordinates associated with pointer input, among other examples.

While examples are described with respect to two different applications 112 and 114, it will be appreciated that similar techniques may be used for one or more windows (e.g., of the same application or of different applications) and/or any of a variety user interface elements, among other examples. Further, while example features (e.g., events and/or user input) are described with which a predicted recording region is generated, it will be appreciated that any of a variety of alternative or additional features may be used in other examples.

Computing device 104 is further illustrated as including scaling engine 118. In examples, a recording region (e.g., as may be determined based on received user input and/or predicted by region predictor 116 according to aspects described herein) is used by scaling engine 118 to scale (e.g., up or down) screen data for encoding by recording encoder 120, thereby generating screen recording output for a given screen recording session. For example, scaling engine 118 scales one or more pixel dimensions of the screen data according to one or more pixel dimensions of the screen recording output. Additionally, or alternatively, scaling engine 118 includes padding, as may be the case when one or more pixel dimensions of the screen data are different than the screen recording output (e.g., even after scaling). While example operations performed by scaling engine 118 are described, it will be appreciated that any of a variety of additional or alternative operations may be performed in other examples. For instance, scaling engine 118 may request that screen data be rendered at a different scaling resolution and/or may artificially upsample the screen data. In examples, a region generated by region predictor 116 gradually increases or decreases in size, thereby animating scaling performed by scaling engine 118 accordingly.

Recording encoder 120 processes screen data (e.g., of a region determined by region predictor 116 and/or as may have been scaled by scaling engine 118) to generate screen recording output accordingly. In examples, hardware encoding is used by recording encoder 120 to generate the screen recording output. In some instances, recording encoder 120 is configured according to a set of associated attributes (e.g., including one or more pixel dimensions) at the beginning of a screen recording session, such that screen data input and/or screen recording output of recording encoder 120 is restricted to the set of associated attributes for the duration of the screen recording session. As such, scaling engine 118 is provided, which may thus scale or otherwise preprocess the screen data to generate preprocessed screen data that conforms to the set of attributes with which recording encoder 120 was configured. Thus, as a recording region changes (e.g., as a result of user input and/or a change to a predicted recording region generated by region predictor 116), screen data that is used to generate the screen recording output is adapted accordingly, thereby permitting a continuous screen recording session even in instances when one or more pixel dimensions of the recording region changes during the screen recording session. In other examples, recording encoder 120 is capable of processing screen data and/or generating screen recording output having varying dimensions during a screen recording session, such that scaling engine 118 may be omitted.

While example aspects are described with respect to server device 102 and computing device 104, it will be appreciated that similar aspects may additionally, or alternatively, be implemented by computing device 104 and server device 102, respectively. For example, computing device 104 may include a training data store, such that a machine learning model is finetuned for one or more users of computing device 104, thereby improving predicted region generation for the user(s). As another example, region predictor 116 may be provided by server device 102, as may be the case when screen data is rendered by server device 102 and presented to a user on computing device 104, among other examples. In examples, region predictor 116, scaling engine 118, and/or recording encoder 120 are provided as part of a screen recording application and/or as part of a screen recording feature of an operating system (or other application) of computing device 104. As another example, region predictor 116, scaling engine 118, and/or recording encoder 120 are provided as part of a screen sharing application/feature, where a user is able to share screen recording output with one or more other users (e.g., as part of an online meeting, via a streaming platform, or for receiving technical support). It will therefore be appreciated that the disclosed aspects thus enable screen recording output having a dynamic screen recording region for any of a variety of scenarios.

Figure 2:
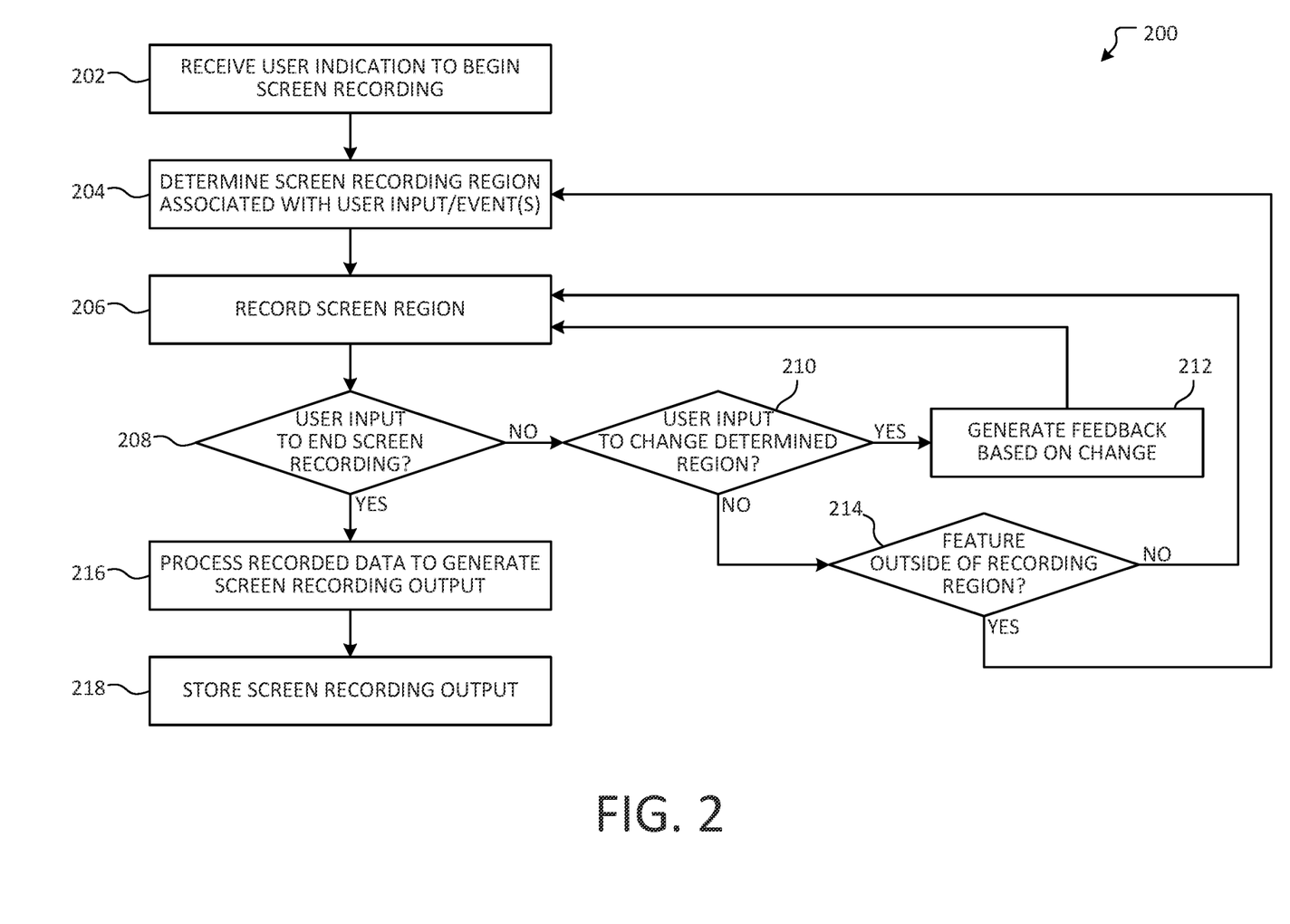
FIG. 2 illustrates an overview of an example method for generating screen recording output according to aspects described herein.

FIG. 2 illustrates an overview of an example method 200 for generating screen recording output according to aspects described herein. In examples, aspects of method 200 are performed by a screen recording application and/or as part of a screen recording feature, example aspects of which were discussed above with respect to region predictor 116, scaling engine 118, and/or recording encoder 120 of system 100 in FIG. 1.

As illustrated, method 200 begins at operation 202, where a user indication to begin screen recording is received. In examples, the indication is received as a result of a user actuating a user interface element, providing pointer input, providing a voice command, and/or providing input via a keyboard, among other examples. While examples are described in which an explicit user indication is received, it will be appreciated that similar techniques may be used in instances where implicit user input is identified or it is otherwise automatically determined to begin screen recording, among other examples.

Flow progresses to operation 204, where a screen recording region is determined. In examples, the screen recording region is determined based on a user indication (e.g., as may have been received as part of operation 202). For example, a user may select a region, window, or application to be included in the screen recording. As another example, operation 204 comprises generating a predicted recording region according to aspects described herein (e.g., by processing a set of features using a set of rules and/or an ML model). Examples of such aspects are discussed in greater detail below with respect to FIG. 4. In examples, aspects of operation 204 are performed by a region predictor, such as region predictor 116 discussed above with respect to FIG. 1. For instance, when operation 204 is performed in a first iteration, a user-specified recording region may be determined, while a subsequent iteration of operation 204 may comprise generating a predicted recording region with which to generate screen recording output.

At operation 206, the screen region that was determined at operation 204 is recorded. For example, screen data corresponding to the determined region is stored. In examples, operation 206 comprises cropping the screen data, such that screen data outside of the determined recording region is omitted. In other examples, such screen data may be omitted at a later time (e.g., operation 216, discussed below). Examples of such aspects are discussed in greater detail below with respect to FIGS. 3A-3C.

Flow progresses to determination 208, where it is determined whether user input is received to end the screen recording session. For example, the user input may include actuation of a user interface element, a voice command, and/or keyboard input, among other examples. Similar to the aspects discussed above with respect to operation 202, other examples may additionally or alternatively comprise identifying one or more implicit inputs and/or automatically determining to end the screen recording session.

If it is determined not to end the screen recording session, flow branches "NO" to determination 210, where it is determined whether user input has been received to change the screen recording region (e.g., as was determined at operation 204). For example, the user input may comprise pointer input corresponding to a handle of the recording region, thereby changing a size/shape of the recording region. As another example, the user input comprises movement of the screen recording region, for example maintaining the same or a similar pixel dimensions while shifting where the region is within the screen. It will be appreciated that any of a variety of additional or alternative input may be received in other examples.

If it is determined that user input has been received to change the screen recording region, flow branches "YES" to operation 212, where feedback is generated based on the change. As noted above, such feedback may be used to improve performance of an ML model with which a predicted recording region was generated. In examples, the feedback includes an indication of the changed recording region and a set of associated factors, thereby indicating a context in which the changed region was used. Accordingly, flow returns to operation 206, where screen recording continues using the changed recording region.

Returning to determination 210, if it is determined that user input has not changed the recording region, flow instead branches "NO" to determination 214, where it is determined whether a feature is outside of the current recording region. As an example, one or more features with which an initial predicted recording region was generated may change, such that it is determined, at determination 214, to update the predicted recording region accordingly. As another example, a feature that is determined to be outside the current recording region may not have been used when a previous predicted recording region was generated. As a further example, a feature may be determined to be outside of an initial, user-provided recording region, such that a predicted recording region is generated and used to record subsequent screen data according to aspects described herein.

Thus, if it is determined that a feature is outside of the recording region, flow branches "YES" and returns to operation 204, such that an updated predicted recording region is determined accordingly. By contrast, if it is determined that there is not a feature outside of the recording region, flow instead branches "NO" and returns to operation 206, where screen recording continues using an unchanged recording region. As such, method 200 iterates between operations 204-214 to adapt a screen recording region with which screen data is recorded according to aspects described herein, thereby dynamically changing which portion of the screen is recorded.

Returning to determination 208, if it is determined that user input to end screen recording has been received, flow instead branches "YES" to operation 216, where the recorded screen data is processed to generate screen recording output accordingly. In examples, operation 216 comprises cropping recorded screen data (e.g., as was recorded at operation 206) according to an associated screen recording region (e.g., as was determined at operation 204). In such an example, each frame of recorded screen data may have an associated recording region with which screen recording output is to be generated. As another example, at least a part of the screen data may have already been cropped (e.g., at operation 206). In some instances, operation 216 comprises scaling the screen data (e.g., using a scaling engine, such as scaling engine 118 in FIG. 1). Additionally, or alternatively, operation 216 comprises encoding the screen data (e.g., using a recording encoder, such as recording encoder 120 in FIG. 1). It will therefore be appreciated that any of a variety of operations may be performed to ultimately generate screen recording output according to aspects of the present disclosure. Additional examples of such aspects are discussed below with respect to FIGS. 3A-3C.

Moving to operation 218, the screen recording output is stored. For example, the screen recording output is stored using local storage of the computing device and/or using storage that is remote from the computing device. In other examples, the screen recording output is additionally or alternatively streamed to another computing device. While method 200 is illustrated as an example in which screen recording output is generated after a screen recording session is terminated, it will be appreciated that similar techniques may be used to generate screen recording output contemporaneously with screen recording, as may be the case when the disclosed aspects are used in a streaming context, among other examples. Method 200 terminates at operation 218.

Figure 3A:
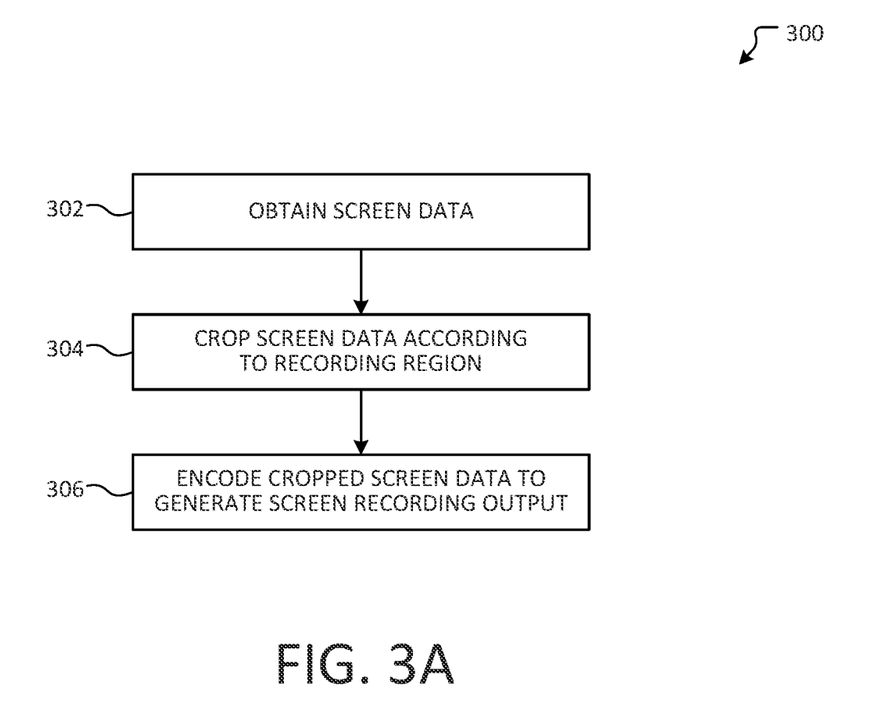
FIG. 3A illustrates an overview of an example method for encoding screen data for a predicted recording region according to aspects described herein.

FIG. 3A illustrates an overview of an example method 300 for encoding screen data for a predicted recording region according to aspects described herein. In examples, aspects of method 300 are performed by a screen recording application and/or as part of a screen recording feature, example aspects of which were discussed above with respect to region predictor 116, scaling engine 118, and/or recording encoder 120 of system 100 in FIG. 1. Aspects of method 300 may be performed as part of predictive screen recording, examples of which were described above with respect to method 200 in FIG. 2.

As illustrated, method 300 begins at operation 302, where screen data is obtained. Aspects of operation 302 may be similar to operation 206 discussed above with respect to method 200 in FIG. 2 and are therefore not necessarily redescribed in detail.

Flow progresses to operation 304, where the obtained screen data is cropped according to a recording region (e.g., as may be determined by a region predictor, such as region predictor 116, performing aspects of operation 206 of method 200 in FIGS. 1 and 2, respectively). At operation 306, the cropped screen data is encoded to generate screen recording output accordingly. Aspects of operation 306 may be performed by a recording encoder, such as recording encoder 120 in FIG. 1. As noted above, the cropped screen data may need to be scaled in some instances, as may be performed by a scaling engine, such as scaling engine 118 in FIG. 1.

Thus, method 300 is provided as an example in which the screen data is cropped according to a screen recording region and, in some examples, encoded contemporaneously with when the screen data is obtained. Such aspects may reduce memory utilization associated with screen recording, which may be preferable in instances where memory and/or storage is limited. Method 300 terminates at operation 306.

Figure 3B:
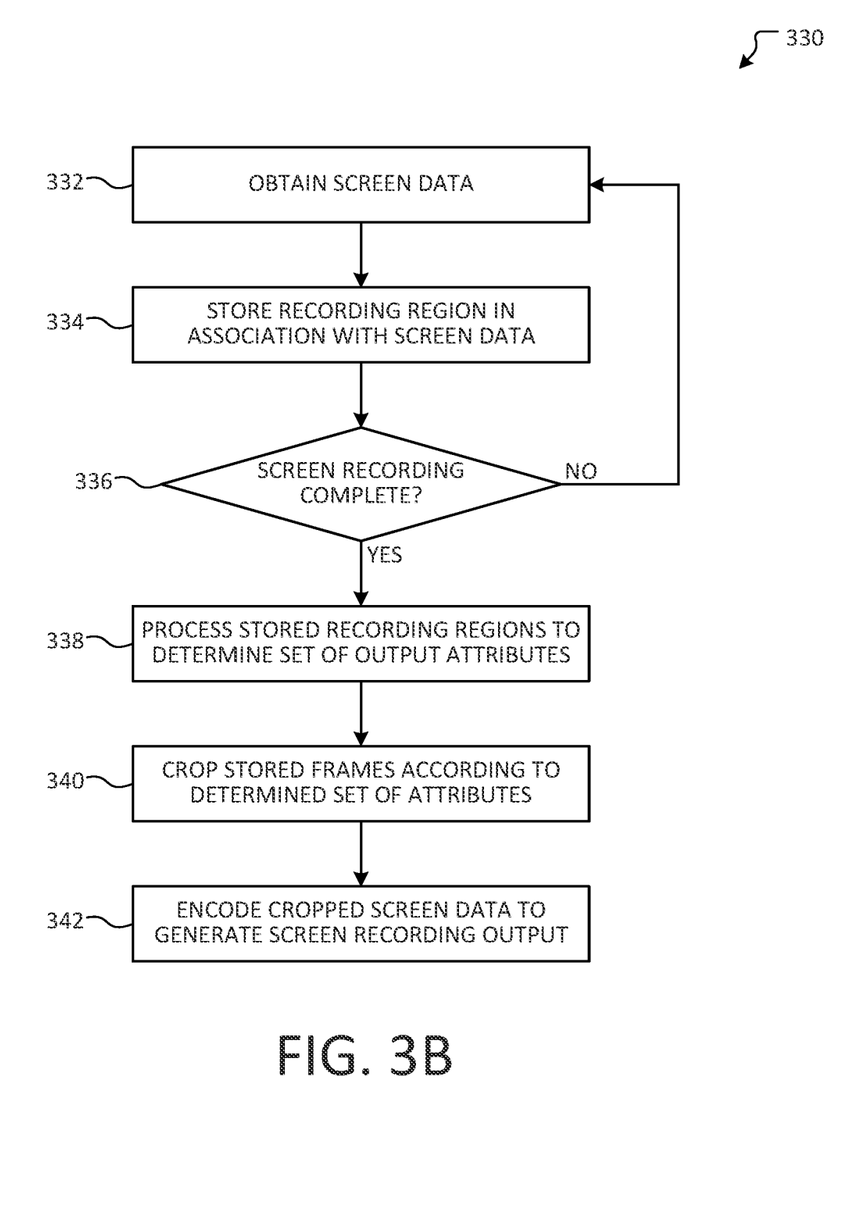
FIG. 3B illustrates an overview of another example method for encoding screen data for a predicted recording region according to aspects described herein.

FIG. 3B illustrates an overview of another example method 330 for encoding screen data for a predicted recording region according to aspects described herein. In examples, aspects of method 330 are performed by a screen recording application and/or as part of a screen recording feature, example aspects of which were discussed above with respect to region predictor 116, scaling engine 118, and/or recording encoder 120 of system 100 in FIG. 1. Aspects of method 330 may be performed as part of predictive screen recording, examples of which were described above with respect to method 200 in FIG. 2.

As illustrated, method 330 begins at operation 332, where screen data is obtained. Aspects of operation 332 may be similar to operation 206 discussed above with respect to method 200 in FIG. 2 and are therefore not necessarily redescribed in detail.

Flow progresses to operation 334, where a screen recording region is stored in association with the screen data. For example, the screen recording region and screen data are stored in memory or using storage of the computing device. In examples, the screen recording region indicates a range of screen data to which the screen recording region applies, such that each stored frame of screen data has an associated recording region associated therewith. In examples, the recording region is user-specified or is a predicted recording region that was generated according to aspects described herein. Such aspects may be similar to those discussed above with respect to operations 204 and 206 in FIG. 2.

At determination 336, it is determined whether screen recording is complete. For example, such aspects may be similar to those discussed above with respect to determination 208 in FIG. 2. If screen recording is not complete, flow branches "NO" and returns to operation 332, such that operations 332 and 334 are performed during the screen recording session. By contrast, if it is determined that screen recording is complete, flow instead branches "YES" to operation 338.

At operation 338, the stored recording regions are processed to determine a set of output attributes for the screen recording output. For example operation 338 determines a set of maximum pixel dimensions for the stored recording regions, such that screen data is cropped according to the set of maximum pixel dimensions, thereby enabling screen recording output having dimensions that correspond to the maximum pixel dimensions of the recording regions. In such an example, the screen recording output may have an aspect ratio that corresponds to the maximum pixel dimensions, such that padding and/or scaling need not be used for the screen data that corresponds to the recording region.

Flow progresses to operation 340, where the stored frames are cropped according to the set of attributes that was determined at operation 338. As an example, the maximum pixel dimensions may be used to scale, crop, and/or pad frames of the screen data based on an associated recording region, such that screen data within the associated recording region is retained and padding is introduced as needed to yield a processed frame of screen data having the maximum pixel dimensions. In some instances, recording region changes may be animated, where the region of screen data that is retained gradually shifts from a first recording region to a second recording region over a series of frames. Aspects of operation 340 may be performed by a scaling engine, such as scaling engine 118 in FIG. 1.

At operation 342, the cropped screen data is encoded to generate screen recording output. Aspects of operation 342 may be performed by a recording encoder, such as recording encoder 120 in FIG. 1. While operations of method 330 are depicted as being sequential, it will be appreciated that one or more such operations may be performed contemporaneously. For example, at least a part of operations 340 and 342 may be contemporaneous, such that an encoder is configured based on the maximum pixel dimensions, and frames are cropped (e.g., at operation 340) and provided for encoding (e.g., at operation 342) contemporaneously. Method 330 terminates at operation 342.

As compared to method 300, method 330 may enable higher-quality output and/or smoother transitions, but may be less resource efficient since screen data is cropped only after screen recording has completed.

Figure 3C:
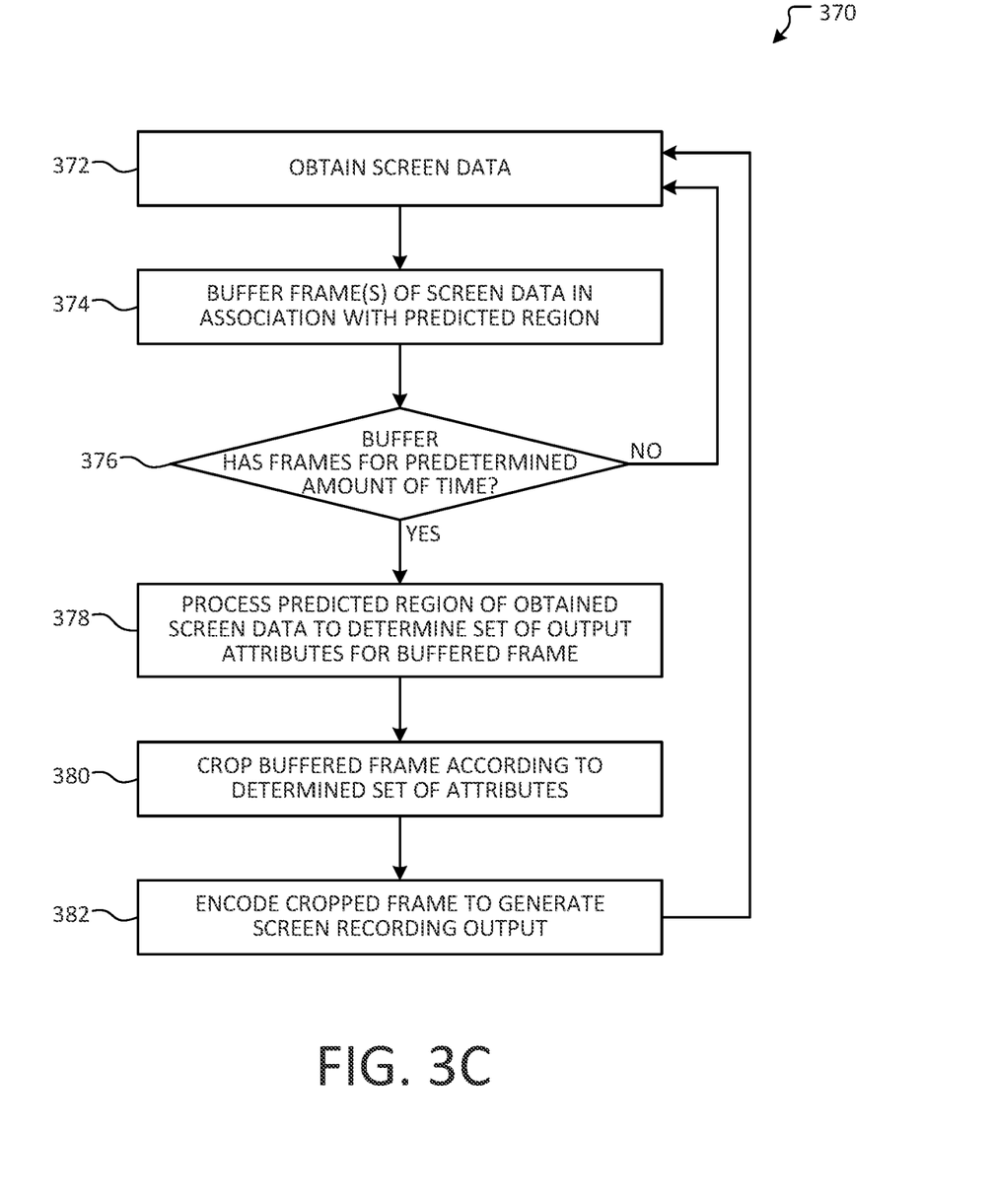
FIG. 3C illustrates an overview of another example method for encoding screen data for a predicted recording region according to aspects described herein.

FIG. 3C illustrates an overview of another example method 370 for encoding screen data for a predicted recording region according to aspects described herein. In examples, aspects of method 370 are performed by a screen recording application and/or as part of a screen recording feature, example aspects of which were discussed above with respect to region predictor 116, scaling engine 118, and/or recording encoder 120 of system 100 in FIG. 1. Aspects of method 370 may be performed as part of predictive screen recording, examples of which were described above with respect to method 200 in FIG. 2.

As illustrated, method 370 begins at operation 372, where screen data is obtained. Aspects of operation 372 may be similar to operation 206 discussed above with respect to method 200 in FIG. 2 and are therefore not necessarily redescribed in detail.

Flow progresses to operation 374, where screen data is buffered (e.g., in memory) in association with a screen recording region. Aspects of operation 374 may be similar to operation 334 discussed above with respect to method 330 in FIG. 3B and are therefore not necessarily redescribed in detail. For instance, each frame of screen data may have an associated recording region associated therewith. Such aspects may be similar to those discussed above with respect to operations 204 and 206 in FIG. 2. While examples are described where screen data is buffered in memory, it will be appreciated that screen data may alternatively or additionally be buffered using storage of the computing device in other examples.

At determination 376, it is determined whether the buffer contains screen data for a predetermined amount of time. In other examples, a predetermined number of frames are buffered. In some examples, the size of the buffer is user-configurable, such that the user may configure the tradeoff between resource utilization and screen recording output quality. If it is determined that the buffer does not yet contain screen data for the predetermined amount of time, flow branches "NO" and returns to operation 372.

If, however, it is determined that the buffer contains screen data for the predetermined amount of time, flow instead branches "YES" to operation 378, where a predicted region of the screen data that was obtained at operation 372 is processed to determine a set of output attributes for a buffered frame of screen recording data. Thus, as a result of processing a buffered frame of screen data based on a more recently obtained frame of screen data, it may be possible to introduce animations and/or other transitions within the screen recording output. Such aspects may be in contrast to the aspects described above with respect to method 300 in FIG. 3A, where cropping/encoding is performed more contemporaneously with screen data capture (e.g., rather than the currently described aspects that incorporate buffering).

Flow progresses to operation 380, where the buffered frame is cropped according to the set of attributes that was determined at operation 378. As an example, the buffered frame is scaled, cropped, and/or padded according to aspects described herein. As noted above, a recording region change may thus be animated, where the region of screen data that is retained gradually shifts from a first recording region to a second recording region over a series of frames. Aspects of operation 380 may be performed by a scaling engine, such as scaling engine 118 in FIG. 1.

At operation 382, the cropped screen data is encoded to generate screen recording output. Aspects of operation 382 may be performed by a recording encoder, such as recording encoder 120 in FIG. 1. While operations of method 370 are depicted as being sequential, it will be appreciated that one or more such operations may be performed contemporaneously. For example, operations 372-376 may be performed contemporaneously with operations 378-382, where a rolling buffer of screen data is maintained and screen data that is removed from the buffer is processed and encoded as described above. Method 370 terminates at operation 382.

As compared to method 300, method 370 may thus enable higher-quality output and/or smoother transitions. However, as compared to method 330, method 370 may potentially less computing resources, as screen data is processed contemporaneously with recording rather than retaining all screen data and processing the screen data after the recording session has completed.

Figure 4:
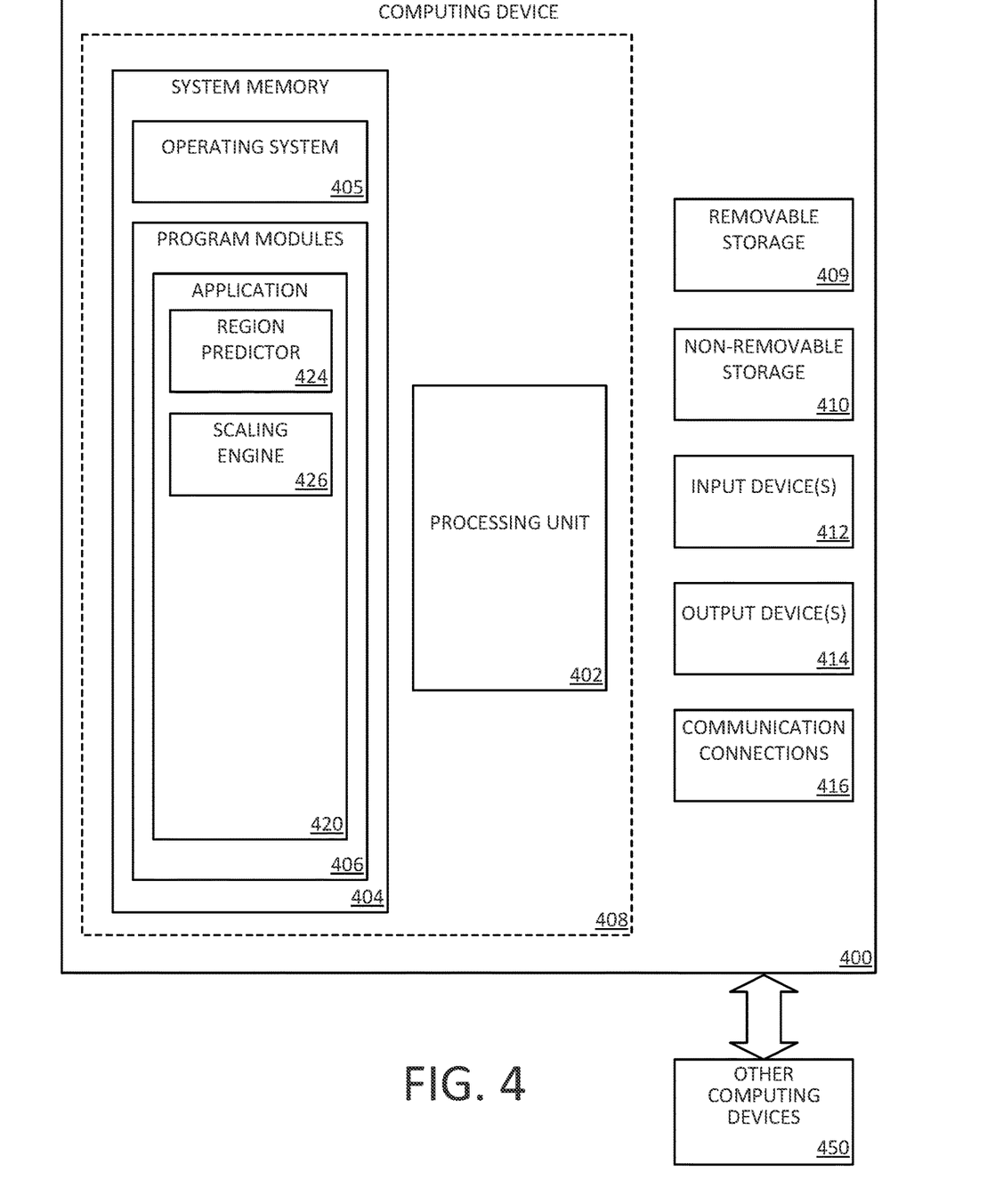
FIG. 4 is a block diagram illustrating example physical components of a computing device with which aspects of the disclosure may be practiced.
Figure 5:
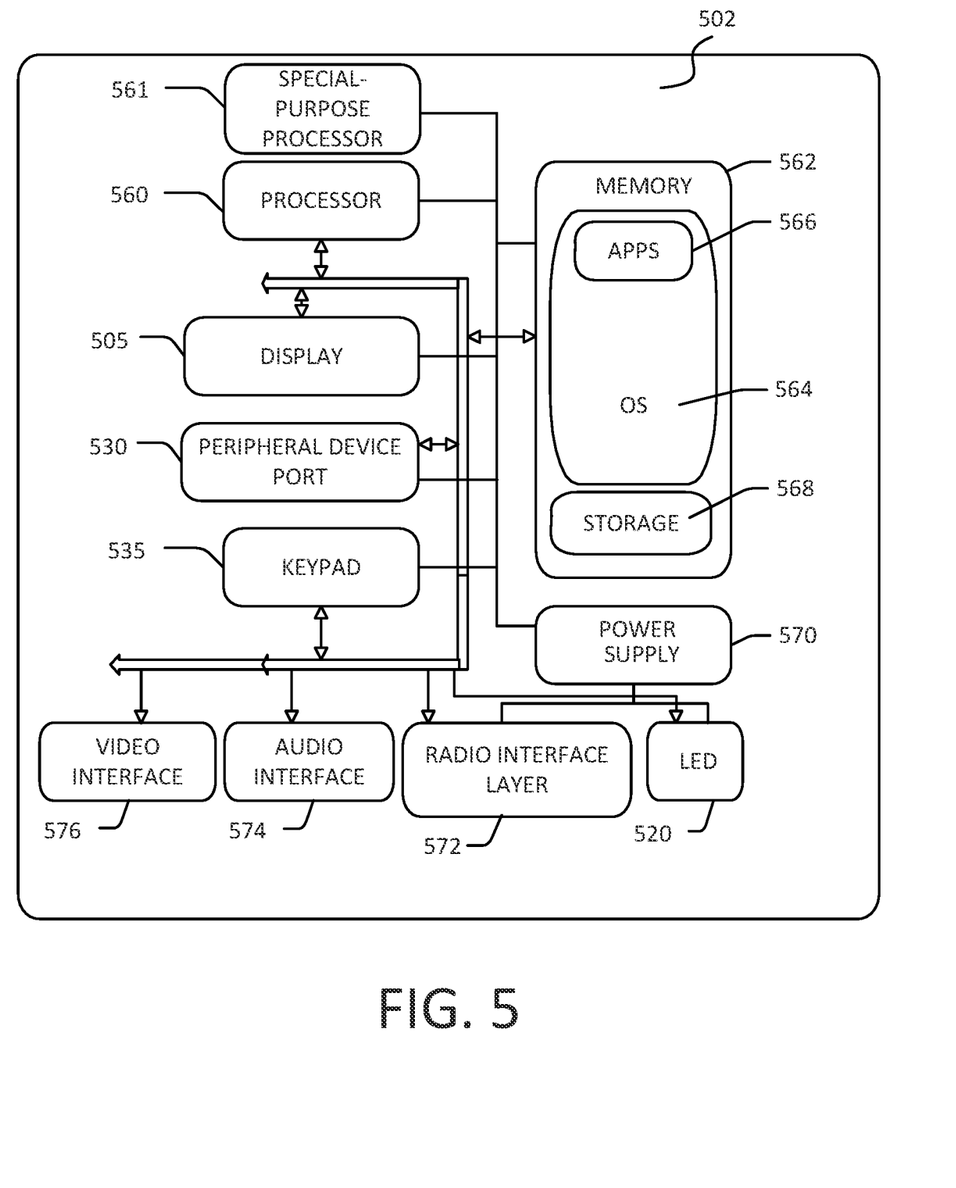
FIG. 5 is a simplified block diagram of a mobile computing device with which aspects of the present disclosure may be practiced.
Figure 6:
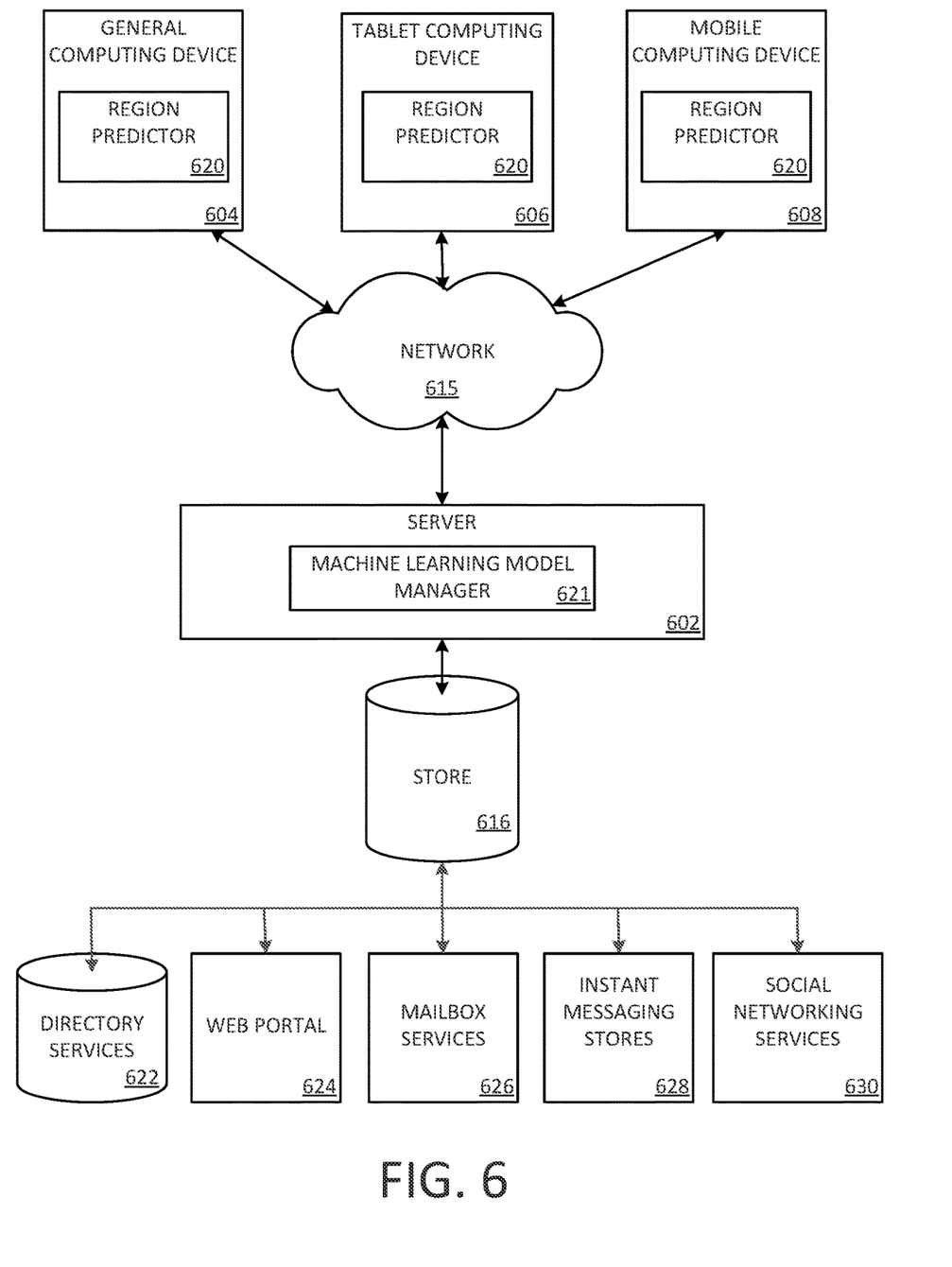
FIG. 6 is a simplified block diagram of a distributed computing system in which aspects of the present disclosure may be practiced.

FIGS. 4-6 and the associated description provides a discussion of an operating environment in which aspects of the disclosure may be practiced. However, illustrated aspects are for purposes of example and illustration and are not limiting of a vast number of computing device configurations that may be utilized for practicing aspects of the disclosure, described herein.

FIG. 4 is a block diagram illustrating physical components (e.g., hardware) of a computing device 400 with which aspects of the disclosure may be practiced. The computing device components described below may be suitable for the computing devices described above, including devices 102 and 104 in FIG. 1. In examples, computing device 400 may be a mobile telephone, a smart phone, wearable computer (such as a smart watch), a tablet computer, a laptop computer, and the like, with which embodiments of the disclosure may be practiced. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for running software application 420, such as one or more components supported by the systems described herein. As examples, system memory 404 may store region predictor 424 and scaling engine 426. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 5 is a block diagram illustrating the architecture of one aspect of a computing device. That is, the computing device can incorporate a system (e.g., an architecture) 502 to implement some aspects. In some examples, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., a region predictor, a scaling engine, etc.).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and/or special-purpose processor 561 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with aspects of the present disclosure, the microphone may also serve as an audio sensor to facilitate control of notifications, as will be described below. The system 502 may further include a video interface 576 that enables an operation of an on-board camera 530 to record still images, video stream, and the like.

A computing device implementing the system 502 may have additional features or functionality. For example, the computing device may also include additional data storage devices (removable and/or non-removable) such as, magnetic disks, optical disks, or tape. Such additional storage is illustrated in FIG. 5 by the non-volatile storage area 568.

Data/information generated or captured by the computing device and stored via the system 502 may be stored locally on the computing device, as described above, or the data may be stored on any number of storage media that may be accessed by the device via the radio interface layer 572 or via a wired connection between the computing device and a separate computing device associated with the computing device, for example, a server computer in a distributed computing network, such as the Internet. As should be appreciated such data/information may be accessed via the computing device via the radio interface layer 572 or via a distributed computing network. Similarly, such data/information may be readily transferred between computing devices for storage and use according to well-known data/information transfer and storage means, including electronic mail and collaborative data/information sharing systems.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630.

A region predictor 620 may be employed by a client that communicates with server device 602. Additionally, or alternatively, machine learning model manager 621 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

It will be appreciated that, as another example, a tablet computing device may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: obtaining, as part of a screen recording session, screen data corresponding to a first region of a screen; identifying a feature associated with a second region of the screen that is different than the first region; obtaining, as part of the screen recording session, screen data corresponding to the second region; and generating screen recording output for the screen recording session, based on: the screen data corresponding to the first region of the screen; and the screen data corresponding to the second region of the screen. In an example, the first region has at least one pixel dimension that is different than the second region. In another example, a pixel dimension of the screen recording output is a maximum pixel dimension of: a pixel dimension of the first region; and a pixel dimension of the second region. In a further example, the screen data corresponding to the first region of the screen is at least one of scaled, cropped, or padded based on the maximum pixel dimension. In yet another example, the feature is an event or a user input that corresponds to the second region of the screen. In a further still example, the first region corresponds to a first application window and the second region corresponds to a second application window different than the first application window. In another example, the first region corresponds to a first application window and the second region corresponds to both the first application window and a second application window.

In another aspect, the technology relates to a method for generating screen recording output. The method comprises: receiving a user indication to initiate a screen recording session; recording, as part of the screen recording session, a first region of a screen; generating, based on at least one of an event or a user input, a predicted recording region that is different than the first region; and continuing the screen recording session using the predicted recording region, thereby generating screen recording output for the screen recording session that includes both the first region of the screen and the predicted recording region. In an example, the method further comprises: receiving user input to change the predicted recording region, thereby yielding a changed recording region; and continuing the screen recording session using the changed recording region. In another example, the method further comprises storing an indication of the changed recording region as training data with which to train a machine learning model. In a further example, the predicted recording region is generated by the machine learning model. In yet another example, the method further comprises: displaying a first graphical representation of the first region; and after the event or the user input, displaying a second graphical representation of the predicted recording region in place of the first graphical representation. In a further still example, continuing the screen recording session using the predicted recording region comprises at least one of scaling or cropping screen data associated with the predicted recording region.

In a further aspect, the technology relates to another method for generating screen recording output. The method comprises: obtaining, as part of a screen recording session, screen data corresponding to a first region of a screen; identifying a feature associated with a second region of the screen that is different than the first region; obtaining, as part of the screen recording session, screen data corresponding to the second region; and generating screen recording output for the screen recording session, based on: the screen data corresponding to the first region of the screen; and the screen data corresponding to the second region of the screen. In an example, the first region has at least one pixel dimension that is different than the second region. In another example, a pixel dimension of the screen recording output is a maximum pixel dimension of: a pixel dimension of the first region; and a pixel dimension of the second region. In a further example, the screen data corresponding to the first region of the screen is at least one of scaled, cropped, or padded based on the maximum pixel dimension. In yet another example, the feature is an event or a user input that corresponds to the second region of the screen. In a further still example, the first region corresponds to a first application window and the second region corresponds to a second application window different than the first application window. In another example, the first region corresponds to a first application window and the second region corresponds to both the first application window and a second application window.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
      initiating a screen recording session corresponding to a first region of a screen;
      identifying a feature associated with a second region of the screen that is different than the first region;
      obtaining, as part of the screen recording session, screen data corresponding to the second region, thereby extending the screen recording session to include the first region of the screen and, as a result of the identified feature associated with the second region, to further include the second region of the screen; and
      generating screen recording output for the screen recording session, based on:
         screen data corresponding to the first region of the screen; and the screen data corresponding to the second region of the screen.

2. The system of claim 1, wherein the first region has at least one pixel dimension that is different than the second region.

3. The system of claim 2, wherein a pixel dimension of the screen recording output is a maximum pixel dimension of:
a pixel dimension of the first region; and
a pixel dimension of the second region.

4. The system of claim 3, wherein the screen data corresponding to the first region of the screen is at least one of scaled, cropped, or padded based on the maximum pixel dimension.

5. The system of claim 1, wherein the feature is an event or a user input that corresponds to the second region of the screen.

6. The system of claim 1, wherein the first region corresponds to a first application window and the second region corresponds to a second application window different than the first application window.

7. The system of claim 1, wherein the first region corresponds to a first application window and the second region corresponds to both the first application window and a second application window.

8. A method for generating screen recording output, the method comprising:
receiving a user indication to initiate a screen recording session;
recording, as part of the screen recording session, a first region of a screen;
generating, based on at least one of an event or a user input, a predicted recording region that is different than the first region; and
continuing the screen recording session using the predicted recording region, thereby generating screen recording output for the screen recording session that includes both the first region of the screen for a first portion of the screen recording output and the predicted, different recording region for a second portion of the screen recording output.

9. The method of claim 8, further comprising:
receiving user input to change the predicted recording region, thereby yielding a changed recording region; and
continuing the screen recording session using the changed recording region.

10. The method of claim 9, further comprising storing an indication of the changed recording region as training data with which to train a machine learning model.

11. The method of claim 10, wherein the predicted recording region is generated by the machine learning model.

12. The method of claim 8, further comprising:
displaying a first graphical representation of the first region; and
after the event or the user input, displaying a second graphical representation of the predicted recording region in place of the first graphical representation.

13. The method of claim 8, wherein continuing the screen recording session using the predicted recording region comprises at least one of scaling or cropping screen data associated with the predicted recording region.

14. A method for generating screen recording output, the method comprising:
initiating a screen recording session corresponding to a first region of a screen;
obtaining, as part of the screen recording session, screen data corresponding to a first region of a screen;
identifying a feature associated with a second region of the screen that is different than the first region;
obtaining, in response to identifying the feature and as part of the screen recording session, screen data corresponding to the second region, thereby expanding the screen recording session to include the first region of the screen and, as a result of the identified feature associated with the second region, to further include the second region of the screen; and
generating screen recording output for the screen recording session, based on:
the screen data corresponding to the first region of the screen; and
the screen data corresponding to the second region of the screen.

15. The method of claim 14, wherein the first region has at least one pixel dimension that is different than the second region.

16. The method of claim 15, wherein a pixel dimension of the screen recording output is a maximum pixel dimension of:
a pixel dimension of the first region; and
a pixel dimension of the second region.

17. The method of claim 16, wherein the screen data corresponding to the first region of the screen is at least one of scaled, cropped, or padded based on the maximum pixel dimension.

18. The method of claim 14, wherein the feature is an event or a user input that corresponds to the second region of the screen.

19. The method of claim 14, wherein the first region corresponds to a first application window and the second region corresponds to a second application window different than the first application window.

20. The method of claim 14, wherein the first region corresponds to a first application window and the second region corresponds to both the first application window and a second application window.

* * * * *